Feb. 27, 1968  E. LOMAS  3,370,449
BILLET EXTRUSION PRESSES
Filed Oct. 4, 1965  2 Sheets-Sheet 1

Inventor
Ernest Lomas
By Hammond and Littell
Attorneys

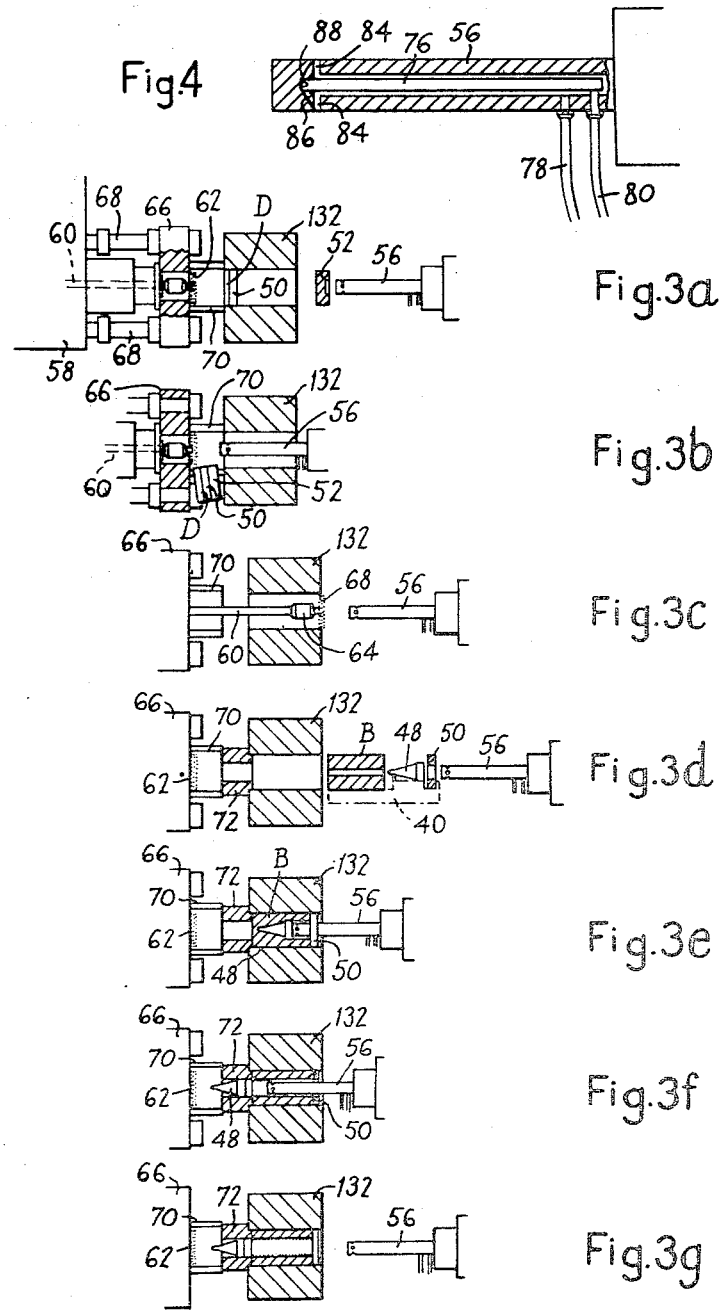

United States Patent Office 3,370,449
Patented Feb. 27, 1968

3,370,449
BILLET EXTRUSION PRESSES
Ernest Lomas, Wimborne, Dorset, England, assignor to The Loewy Engineering Company Limited, Bournemouth, England, a company of Great Britain
Filed Oct. 4, 1965, Ser. No. 492,787
Claims priority, application Great Britain, Oct. 2, 1964, 40,295/64
5 Claims. (Cl. 72—263)

ABSTRACT OF THE DISCLOSURE

Describes an extrusion press, for metal, with a movable billet container carrier carrying a plurality of billet containers, which moves the billet containers from a working station in the axis of the press to parking stations outside the press axis, and perforating means to perforate a billet in a container at a parking station.

---

It is usual to employ perforated billets for the extrusion of tubes or other hollow articles from metal billets if extrusion takes place on a press equipped with a mandrel. Perforation of the billets can take place either inside or outside the extrusion press. The first method is adopted when relatively little power is required for the perforation of the billets, as is the case with billets of brass or aluminium. In this case, the mandrel of the extrusion press is used as a perforating tool.

The second method, which is primarily used in the case of billets of copper, steel and various other metals of relatively high melting point, requires the installation of a separate press in which the billets are perforated, as well as of separate handling equipment for the billets before and after their perforation, such as heaters and conveyors. The provision of this separate press and its handling equipment requires additional floor space and increases considerably the cost both of the installation and of the operation of the extrusion plant.

It is the main object of the present invention to provide a billet extrusion press, particularly for the extrusion of tubes and other hollow articles, which has means for perforating billets prior to extrusion, and in which the perforating operation can be carried out in a more expeditious manner than was formerly possible.

The press according to the invention is of the kind in which a plurality of containers are mounted on a common movable carrier. This arrangement makes it possible to move these containers in succession into a working station in which they are in the main axis of the press, and into one or more parking stations in which they are outside this axis. When in the working station, a container is aligned with the extrusion stem and mandrel of the press, so that the stem can act on the billet in the container and extrude it. The parking stations are utilised for carrying out subsidiary operations on a container, such as loading a billet in the container, clearing the container bore after an extrusion operation by ejecting the discard and cleaning the bore, and lubricating the latter whenever necessary. Separate power means comprising hydraulic ram-and-cylinder units are then provided at the parking stations for operating implements which carry out the subsidiary operations.

According to the present invention, a press of the kind described has perforating means which are so arranged in the press that they can act on a billet in a container which is at a parking station. Thus, the perforating operation can be carried out on a billet in one container while another billet is extruded from another container which is at the working station. Thus, the perforating operation does not prolong the complete extrusion cycle. This is of importance in the case of high-production extrusion plants with multi-container presses which are designed for high output and in which accordingly a complete extrusion cycle should be as short as possible.

The perforating means of the press according to the invention may be provided at a parking station where other subsidiary operations are carried out. In this case, the same hydraulic power means may be used for the perforating means and for the implements for these other subsidiary operations, in which event the perforating means may be exchangeable for these implements.

According to present-day practice, perforation of billets prior to extrusion is carried out by two different methods. In the first, an imperforate billet is pierced right through by a perforating tool having the same diameter as the desired billet bore. In the second and more recent method, a pilot bore of smaller diameter than the desired billet bore is first drilled into an imperforate billet, and this pilot bore is then enlarged to its final diameter by an expanding tool. It will be understood that less power is normally required for the second than for the first method. It may therefore be possible to employ the second method in a press according to the invention without any increase of the power provided for the other subsidiary operations which are carried out at the same parking station.

Backing means, e.g., in the form of gag-plates, may be provided at that parking station of the press according to the invention where the perforation of a billet takes place. These backing means serve the purpose of resisting axial forces which, during the perforating operation, may act on a container at that parking station and on the billet which is perforated, and thereby prevent the billet from being pushed out from the container during its perforation.

If the press according to the invention is used for the extrusion of billets whose bore is to be lubricated prior to extrusion, it is preferably to provide bore-lubricating means at the same parking station at which the billets are perforated. The lubricating means may be provided in the perforating tool itself or in a stem which is used for displacing this tool in a billet or any other implements for subsidiary operations, the stem or the implements entering the bore of the billet after the bore has been formed by the above-mentioned tool.

An embodiment of the invention will now me described by way of example with reference to the accompanying drawings, in which:

FIGS. 3a to 3g show diagrammatically several stages of a complete cycle of subsidiary operations of the press of FIGS. 1 and 2.

FIG. 4 is a section through a stem which is used in the press according to the invention for the perforation of billets, and which has means for lubricating the bore of the billets after their perforation.

Figure 1:
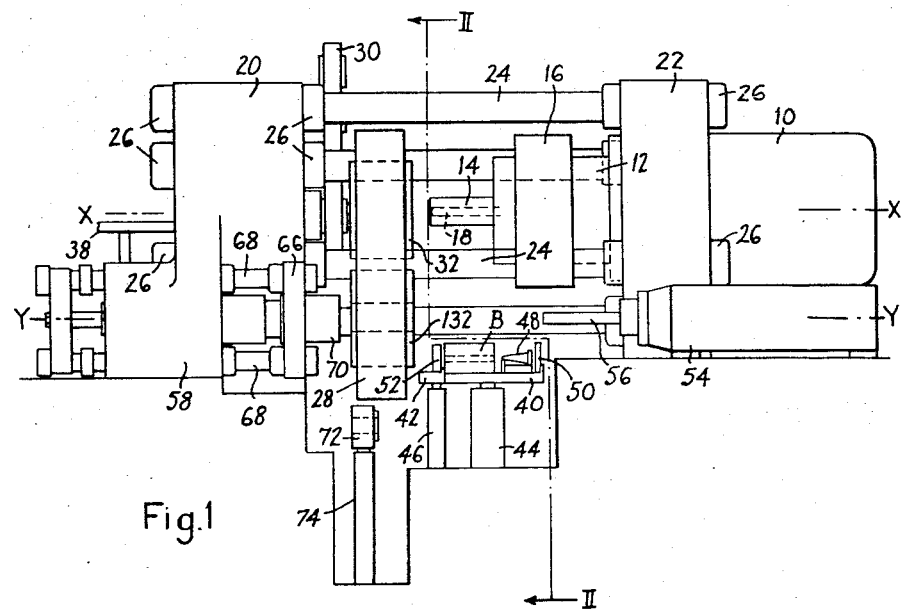
FIG. 1 is a side elevation of a billet extrusion press into which the invention has been incorporated.
Figure 2:
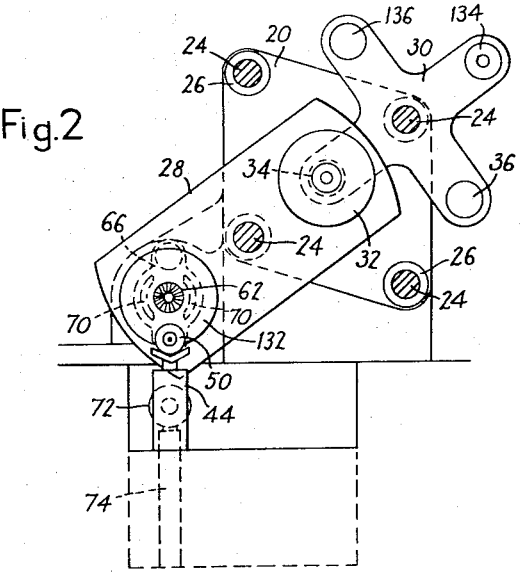
FIG. 2 is a transverse section through a press along the line II—II of FIG. 1.

The press shown in FIGS. 1 and 2 is a billet extrusion press of the horizontal type. The press has a main cylinder 10 in which a main ram (not shown) is displaceable. The latter has a forward extension 12 to which a pressing stem 14 is attached. The extension 12 is secured to a crosshead 16. A mandrel 18 can be telescoped into and out of the pressing stem 14 by means not shown. Arranged opposite the main cylinder 10 is a platen 20 which is connected to a main cylinder crosshead 22 by tie-rods or columns 24 and nuts 26.

A rotatable carrier 28 is mounted on one of the two lower columns 24, as shown in FIG. 2, and a second rotatable carrier 30 is mounted on the diagonally opposite upper column 24. The carrier 28 is of substantially rectangular shape and supports two billet containers 32 and 132 of similar size and design. The arrangement of the two containers on the carrier 28 is such that while one container is in the main axis X—X of the press, and thereby in alignment with the pressing stem 24 and the mandrel 18, the other container is at a parking station outside this axis. Rotation of the carrier 28 about its column by 180° exchanges the positions of the two containers relative to the axis X—X.

The carrier 30 is of substantially cruciform shape. Mounted at the ends of two of its diagonally opposite arms are die-assemblies 34 and 134, respectively, the arrangement of the die-assemblies on the carrier 30 being such that one of the die-assemblies is in the main axis X—X of the press while the other die-assembly is at a parking station. Rotation of the carrier 30 about its column by 180° exchanges the positions of the two die-assemblies relative to the axis X—X. The other two arms of carrier 30 have at their ends holes 36 and 136 large enough to permit ejection therethrough of cold and unextrudable billets from a container.

The press is operated in the well-known manner in that a perforated billet is extruded from a container 32 or 132 by the pressing stem 14 through a die 34 or 134 after the mandrel 18 has been advanced through the bore of the billet and into the aperture of the die. After extrusion, the unextrudable remainder of a billet is severed from the extruded article by a saw or shear (not shown) whereupon the article is withdrawn from the press through a tunnel in the platen 20 and on to a runout table 38.

The press is further equipped with the usual means (not shown) for returning the pressing stem 14 and mandrel 18 to their starting positions. There are also means for moving each of the carriers 28 and 30 independently of each other in the direction of the axis X—X, whereby a die can be separated from its container or from its support on the platen 20.

While the above-described operations are being carried out on a container which is at the working station in the axis X—X, subsidiary operations are carried out on another container which is at a parking station outside this axis. These subsidiary operations include here the perforation of a billet B, prior to extrusion, in addition to the loading of a billet and a pressing disc into the container, and the ejection of the discard and the cleaning and lubrication of the container.

Accordingly, the press according to the invention has at a parking station of the containers 32, 132, a large tray 40 and a small tray 42 which can be moved into positions near the axis Y—Y of the container at the parking station by hydraulic jacks 44 and 46 respectively. The tray 40 serves as a carrier for a billet B, a perforating tool 48 and a pressing disc 50; the tray 42 serves as a carrier for a cleaning disc 52. The billet B has an axial pilot bore of small diameter compared with its final bore. The tool 48 has the shape of a cone with a tip small enough to enter the pilot bore, while its base has the diameter of the final bore. The pressing disc 50 and the cleaning disc 52 are of the usual shape. An auxiliary hydraulic unit 54 is arranged in the axis Y—Y and has a stem 56 attached to its movable member. The stem is slender enough to pass through the aperture in pressing disc 50.

A second auxiliary hydraulic unit 58 is arranged in the lower part of platen 20 and on that side of the carrier 28 opposite that which faces the hydraulic unit 54. The unit 58 operates a rod 60 to which a rotary brush 62 for cleaning the interior of a container is attached, together with a motor 64 (FIG. 3a). An auxiliary crosshead 66 is secured by tie-rods 68 to the lower part of platen 20. Crosshead 66 has an opening in the axis Y—Y for the passage of brush 62 and motor 64. Semi-cylindrical gag-plates 70 are secured to crosshead 66, enclosing a space wide enough to receive the unextrudable remainder of a billet. Backing means in the form of an apertured bolster 72 can be inserted by a jack 74 (FIG. 1) between a container at a parking station and the gag-plates 70. The aperture in the bolster 72 is just large enough to receive the perforating tool 48 and has a spigot at one side, so that the bolster can be centered in the bore of a container 132 at the parking station.

The stem 56 is shown in some detail in FIG. 4. The stem is hollow, but closed at its front end. A tube 76 extends axially along the interior of the stem and is of sufficient slenderness to leave an annular space between itself and the stem. Attached to the stem 56 near its rear end is a flexible pipe 78 which supplies compressed air to the annular space between stem and tube. Attached to the tube 76 near its end is a further flexible pipe 80 which supplies a powdered extrusion lubricant to the interior of the tube. The tube 76 has small holes 88 at its front end for the discharge of the powdered lubricant. The stem 56 has holes 84 at its front end for the discharge of a blast of powdered lubricant suspended in compressed air. Further diagonal holes 86 are formed in the head of stem 56 near the holes 88 so as to guide the powdered lubricant into the holes 84 adjacent the outer end of holes 84.

A complete cycle of subsidiary operations will now be described with reference to FIGS. 3a to 3g:

FIG. 3a shows the various parts at a parking station, with a container 132 at that station after a billet has been extruded from that container while at the working station, and the extruded article severed from the unextrudable remainder or discard D left in the container bore. The container is axially moved after rotation so that it is in contact with the gag-plates 70. The cleaning disc 52 has been moved already into line with stem 56 by lifting of the tray 42.

In the next step, shown in FIG. 3b, the cleaning disc 52 is pushed by stem 56 into and through the container bore from one end and ejected therefrom at the other end, together with discard D and pressing disc 50 adhering thereto. Thereafter, the stem 56 is retracted. During the ejection operation the container is held against axial displacement by its contact with the gag-plates 70.

After the container bore has thus been cleaned, the brush 62 and its motor 64 are advanced into the container bore by rod 60 (FIG. 3c), whereby the bore is cleaned and freed from any scale or dried lubricant. At the same time, the container is axially displaced and moved away from the gag-plates 70. The container is now ready to receive a fresh billet B.

Before this billet is loaded into the container, the bolster 72 is inserted by jack 74 between the container and the gag-plates 70. The tray 40 is now lifted and a billet B, the perforating tool and the pressing disc 50, are all moved into the axis Y—Y and thus into line with stem 56 (FIG. 3d). The brush 62 and its motor 64 are retracted towards and into the aperture of crosshead 66. The billet B, the tool 48 and the disc 50 are moved together by stem 56 into the bore of the container.

In the next stage, the perforating tool 48 is forced by stem 56 through the pilot bore of the billet, enlarging this bore to its final size. The pressing disc 50 is arrested by the billet, with the stem 56 passing through the disc (FIG. 3e). The bolster 72 being in engagement with the container and billet, takes any axial forces to which, during the advance of the tool 48, they may be subjected, also preventing the billet from being pushed out during perforation by tool 48.

At the end of its stroke, the tool 48 enters the bolster 72, whereupon the stem 56 is withdrawn, the tool remaining in the bolster, while the pressing disc 50 remains in the container (FIG. 3f). During the withdrawal of the stem 56, the lubricating system for the billet bore, shown in FIG. 4 and described above, is made effective and powdered lubricant deposited over the entire length of the billet bore.

After full retraction of the stem 56 (FIG. 3g), the container is shifted first a short distance in one direction to enable bolster 72 and tool 48 received therein to be moved out of the way by the lowering of jack 74 onto which they have been previously deposited, whereupon the container is moved in the opposite direction to resume the position it has in FIGS. 1, 3a and 3b. The container is now ready to be moved from the parking to the working station. This is effected by rotation of the carrier 28 whereby the two containers 32 and 132 exchange their positions. The container 32 which was at the working station is thereby transferred to the parking station and a complete cycle of subsidiary operations, as described with reference to container 132, is now carried out with respect to container 32 while extrusion is in progress in container 132.

The above-described arrangement allows perforation of a billet to be performed at a parking station for the container of an extrusion press, while another billet is extruded at a working station of the press, thus saving valuable time and, moreover, making it unnecessary to provide special presses for the perforation of the billets.

The invention is capable of other embodiments than the one shown and described here. It is, for instance, possible to use imperforate billets as starting material. The billets are then pierced through at the parking station of the press, instead of being merely expanded.

The press may have more than one parking station. In this case, the subsidiary operations may be distributed over several parking stations. It is, for example, possible to produce a pilot bore at one parking station by piercing a small hole in the billet and expanding this hole in the manner described at another parking station.

I claim:
1. A billet extrusion press for tubes or other hollow articles, said press having an extrusion axis, a mandrel, a billet container carrier, a plurality of billet containers mounted on said carrier, said carrier being movable so that said containers can be moved in succession into a working station in which they are aligned with said extrusion stem and mandrel, and into at least one parking station, and perforating means arranged so that they can act on a billet in a container which is at a parking station.

2. A billet extrusion press according to claim 1, in which the perforating means consist of means for expanding a pilot bore in a billet.

3. A billet extrusion press according to claim 1, having hydraulic means for moving a perforating tool through a billet which is in a container at a parking station.

4. A billet extrusion press according to claim 3, having a stem movable by said hydraulic means and a perforating tool in the form of a head detachably mounted on said stem.

5. A billet extrusion press according to claim 1, having backing means adapted to engage a container which is at the parking station having the perforating means, said backing means engaging said container at that end thereof which is remote from that perforating means.

References Cited
UNITED STATES PATENTS

| | | | |
|---|---|---|---|
| 3,182,478 | 5/1965 | Asari | 72—263 |
| 3,217,527 | 11/1965 | Elger | 72—263 |
| 3,228,226 | 1/1966 | Elger | 72—263 |
| 3,240,046 | 3/1966 | Salter | 72—263 |

CHARLES W. LANHAM, *Primary Examiner.*